(12) United States Patent
A et al.

(10) Patent No.: US 11,985,023 B2
(45) Date of Patent: May 14, 2024

(54) SUPPORTING GRAPHQL BASED QUERIES ON YANG BASED CONFIGURATION DATA MODELS

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 298 days.

(21) Appl. No.: 16/144,313

(22) Filed: Sep. 27, 2018

(65) Prior Publication Data
US 2020/0106658 A1 Apr. 2, 2020

(51) Int. Cl.
*H04L 12/24* (2006.01)
*G06F 16/21* (2019.01)
(Continued)

(52) U.S. Cl.
CPC .......... *H04L 41/024* (2013.01); *G06F 16/211* (2019.01); *G06F 16/2246* (2019.01); *G06F 16/2448* (2019.01); *H04L 41/0853* (2013.01)

(58) Field of Classification Search
CPC .. H04L 41/0853; H04L 41/024; G06F 16/211; G06F 16/2246; G06F 16/2448
See application file for complete search history.

(56) References Cited

U.S. PATENT DOCUMENTS

| | | |
|---|---|---|
| 5,870,559 A | 2/1999 | Leshem |
| 5,933,642 A | 8/1999 | Greenbaum et al. |

(Continued)

FOREIGN PATENT DOCUMENTS

| | | |
|---|---|---|
| CN | 105227342 A | 1/2016 |
| CN | 105376087 A | 3/2016 |

(Continued)

OTHER PUBLICATIONS

Harrington et al., "An Architecture for Describing Simple Network Management Protocol (SNMP) Management Frameworks," Network Working Group, RFC 3411, Dec. 2002, 64 pp.

(Continued)

*Primary Examiner* — Hosain T Alam
*Assistant Examiner* — Chongsuh Park
(74) *Attorney, Agent, or Firm* — Shumaker & Sieffert, P.A.

(57) ABSTRACT

In one example, a network management system (NMS) device manages a plurality of network devices. The device includes a memory configured to store data representing a data model for a plurality of network devices managed by the NMS, and one or more processors configured to retrieve data representing the data model, construct a GraphQL model having a plurality of nodes, each of the nodes corresponding to one of the network devices according to the data model store data representing properties of the network devices associated with corresponding nodes of the GraphQL model according to the data model, receive a GraphQL query including data representing at least one query property, determine which of the nodes has a property matching the at least one query property, and return data identifying which of the network devices corresponds to the nodes having the property matching the at least one query property.

20 Claims, 9 Drawing Sheets

(51) Int. Cl.
  *G06F 16/22* (2019.01)
  *G06F 16/242* (2019.01)
  *H04L 41/02* (2022.01)
  *H04L 41/0853* (2022.01)

(56) References Cited

U.S. PATENT DOCUMENTS

| | | | |
|---|---|---|---|
| 6,041,053 | A | 3/2000 | Douceur et al. |
| 6,078,744 | A | 6/2000 | Wolczko et al. |
| 6,298,321 | B1 | 10/2001 | Karlov et al. |
| 6,678,646 | B1 | 1/2004 | McConnell et al. |
| 6,973,488 | B1 | 12/2005 | Yavatkar et al. |
| 7,209,473 | B1 | 4/2007 | Mohaban et al. |
| 7,457,296 | B2 | 11/2008 | Kounavis et al. |
| 7,493,528 | B1 | 2/2009 | Reichert et al. |
| 7,953,779 | B1 | 5/2011 | Ragusa et al. |
| 8,069,374 | B2 | 11/2011 | Panigrahy et al. |
| 8,266,416 | B2 | 9/2012 | Ishihara et al. |
| 8,571,882 | B1 | 10/2013 | Teitelbaum |
| 8,572,717 | B2 | 10/2013 | Narayanaswamy |
| 9,117,071 | B2 | 8/2015 | Beretta et al. |
| 9,705,815 | B2 | 7/2017 | Mattson et al. |
| 9,727,339 | B2 | 8/2017 | Zelsnack |
| 9,734,056 | B2 | 8/2017 | Shi et al. |
| 9,755,960 | B2 | 9/2017 | Moisand et al. |
| 9,979,738 | B2 | 5/2018 | Holland et al. |
| 10,102,172 | B1 | 10/2018 | Mai et al. |
| 10,122,872 | B1 | 11/2018 | Shin et al. |
| 10,148,506 | B1 | 12/2018 | Anburose et al. |
| 10,200,248 | B1 | 2/2019 | Jiang et al. |
| 10,278,112 | B1 | 4/2019 | A et al. |
| 10,374,886 | B1 | 8/2019 | A et al. |
| 10,382,265 | B1 | 8/2019 | Anburose et al. |
| 10,516,761 | B1 | 12/2019 | A et al. |
| 10,558,542 | B1 | 2/2020 | A et al. |
| 10,567,223 | B1 | 2/2020 | Sidaraddi et al. |
| 10,841,182 | B2 | 11/2020 | A et al. |
| 2002/0019864 | A1 | 2/2002 | Mayer |
| 2004/0064538 | A1 | 4/2004 | Wong |
| 2009/0164773 | A1 | 6/2009 | Ishihara et al. |
| 2012/0110028 | A1 | 5/2012 | Athreya et al. |
| 2013/0191766 | A1 | 7/2013 | Ragusa et al. |
| 2014/0181797 | A1 | 6/2014 | Beretta et al. |
| 2015/0381515 | A1 | 12/2015 | Mattson et al. |
| 2016/0050125 | A1 | 2/2016 | Mattson et al. |
| 2016/0062746 | A1 | 3/2016 | Chiosi et al. |
| 2016/0072676 | A1 | 3/2016 | Gomadam et al. |
| 2016/0211988 | A1 | 7/2016 | Lucas et al. |
| 2016/0269250 | A1 | 9/2016 | Astigarraga et al. |
| 2016/0342397 | A1 | 11/2016 | Goetz et al. |
| 2016/0350095 | A1 | 12/2016 | Ramachandran et al. |
| 2017/0054758 | A1 | 2/2017 | Maino et al. |
| 2017/0078158 | A1* | 3/2017 | Dec .................... G06F 11/30 |
| 2017/0091993 | A1 | 3/2017 | Andrew et al. |
| 2017/0099183 | A1 | 4/2017 | Vaidyanathan et al. |
| 2017/0127466 | A1 | 5/2017 | Narasimha |
| 2017/0177738 | A1 | 6/2017 | Goldman |
| 2017/0187577 | A1* | 6/2017 | Nevrekar ............ H04L 41/0226 |
| 2018/0019917 | A1 | 1/2018 | Agarwal et al. |
| 2018/0150569 | A1 | 5/2018 | Wechsler et al. |
| 2018/0167277 | A1 | 6/2018 | Mahimkar et al. |
| 2018/0210927 | A1* | 7/2018 | Karam ................. G06F 16/248 |
| 2018/0232402 | A1 | 8/2018 | Bhatti et al. |
| 2018/0276863 | A1 | 9/2018 | Nerurkar et al. |
| 2018/0329958 | A1 | 11/2018 | Choudhury et al. |
| 2018/0351806 | A1 | 12/2018 | Mohanram et al. |
| 2019/0013017 | A1 | 1/2019 | Kang et al. |
| 2019/0104026 | A1 | 4/2019 | Zhang et al. |
| 2019/0182119 | A1 | 6/2019 | Ratkovic et al. |
| 2019/0266619 | A1 | 8/2019 | Namba et al. |
| 2020/0084120 | A1 | 3/2020 | A et al. |
| 2020/0412614 | A1 | 12/2020 | A et al. |
| 2021/0144072 | A1 | 5/2021 | A et al. |

FOREIGN PATENT DOCUMENTS

| | | |
|---|---|---|
| CN | 108140260 A | 6/2018 |
| CN | 108475506 A | 8/2018 |
| CN | 109271621 A | 1/2019 |
| CN | 111756563 A | 10/2020 |
| EP | 2961100 A1 | 12/2015 |
| EP | 3327727 A2 | 5/2018 |
| FR | 2902954 A1 | 12/2007 |
| WO | 2017204872 A1 | 11/2017 |

OTHER PUBLICATIONS

Bierman et al., "RESTCONF Protocol," IETF, RFC 8040, Jan. 2017, 137 pp.
"Introduction to GraphQL," https://graphql.org/learn/, Accessed Sep. 20, 2018, 3 pp.
Byron, "GraphQL: A data query language," https://code.fb.com/core-data/graphql-a-data-query-language/, Posted Sep. 14, 2015, 5 pp.
Jiang et al., "Translating High-Level Configuration Instructions to Low-Level Device Configuration," U.S. Appl. No. 15/198,657, filed Jun. 30, 2016.
Chandrasekhar et al., "Processing Multiple Parallel High Level Configuration Changes for Managed Network Devices," U.S. Appl. No. 15/396,262, filed Dec. 30, 2016.
Sivakumar et al., "Concepts of Network Intent," draft-moulchan-nmrg-network-intent-concepts-00, Internet Research Task Force, Oct. 28, 2017, 10pp.
Sadasivarao et al., "Demonstration of Advanced Open WDM Operations and Analytics, based on an Application-Extensible, Declarative, Data Model Abstracted Instrumentation Platform," 2019 Optical Fiber Communications Conference and Exhibition, OSA, Mar. 3, 2019, 3 pp.
Athanas et al., "An Adaptive Hardware Machine Architecture and Compiler for Dynamic Processor Reconfiguration," Laboratory for Engineering Man/Machine Systems, Division of Engineering, Brown University, 1991, 4 pp.
Nguyen, "Model-based Version and Configuration Management for a Web Engineering Lifecycle," Proceedings of the 15th International Conference on World Wide Web, ACM, New York, NY, May 23, 2006, 10 pp.
Enns, "NETCONF Configuration Protocol," Network Working Group, RFC 4741, Dec. 2006, 96 pp.
Bjorklund, "YANG—A Data Modeling Language for the Network Configuration Protocol (NETCONF)," Internet Engineering Task Force, RFC 6020, Oct. 2010.
"Gremlin Docs," gremlindocs.spmallette.documentup.com, retrieved on Mar. 29, 2019, 34 pp.
"Gremlin," Github, github.com/tinkerpop/gremlin/wiki, Jul. 11, 2016, 4 pp.
"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).
"OpenConfig," Github, github.com/openconfig, retrieved on Mar. 29, 2019, 3 pp.
Ribeiro et al., "G-Tries: an efficient data structure for discovering network motifs," Proceedings of the 2010 ACM Symposium on Applied Computing, New York, NY, Mar. 22, 2010, 8 pp.
U.S. Appl. No. 15/462,465, Juniper Networks, Inc. (Inventor: Chandrasekhar A), filed Mar. 17, 2017.
U.S. Appl. No. 16/370,189, Juniper Networks, Inc. (Inventor: Chandrasekhar A), filed Mar. 29, 2019.
U.S. Appl. No. 16/282,160, Juniper Networks, Inc. (Inventor: Chandrasekhar A), filed Feb. 21, 2019.
U.S. Appl. No. 16/370,243, Juniper Networks, Inc. (Inventor: Chandrasekhar A), filed Mar. 29, 2019.
U.S. Appl. No. 16/456,976, Juniper Networks, Inc. (Inventor: Chandrasekhar A), filed Jun. 28, 2019.
Extended European Search Report from counterpart European Application No. 19180764.3, dated Dec. 19, 2019, 8 pp.

(56) References Cited

OTHER PUBLICATIONS

Wallin et al., "Automating Network and Service Configuration Using NETCONF and YANG," Sep. 23, 2011, 13 pp.

Cechak, "Using GrahpQL for Content Delivery in Kentico Cloud," Masaryk University Faculty of Informatics, Bachelor's Thesis, Fall 2017, 63 pp.

Response to Extended European Search Report dated Dec. 19, 2019, from counterpart European Application No. 19180764.3, filed Oct. 1, 2020, 11 pp.

Communication pursuant to Article 94(3) EPC from counterpart European Application No. 19180764.3 dated Oct. 21, 2021, 8 pp.

Extended Search Report from counterpart European Application No. 23204745.6 dated Nov. 7, 2023, 10 pp.

First Office Action and Search Report, and translation thereof, from counterpart Chinese Application No. 2019105776562 dated Dec. 24, 2021, 14 pp.

Notice of Intent to Grant and Text Intended to Grant from counterpart European Application No. 19180764.3 dated Jun. 23, 2023, 93 pp.

Notice of Intent to Grant, and translation thereof, from counterpart Chinese Application No. 201910577656.2 dated Aug. 26, 2022, 3 pp.

Response to Communication pursuant to Article 94(3) EPC dated Oct. 21, 2021, from counterpart European Application No. 19180764.3 filed Feb. 18, 2022, 20 pp.

Second Office Action, and translation thereof, from counterpart Chinese Application No. 201910577656.2 dated May 16, 2022, 7 pp.

\* cited by examiner

SUPPORTING GRAPHQL BASED QUERIES ON YANG BASED CONFIGURATION DATA MODELS

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. NM Systems may support these services such that an administrator can easily create and manage these high-level network configuration services. In customer deployments, there may be thousands to millions of connectivity services. When the services are changed, the NM System typically deploys in the network via transactions. In some cases, there may be concurrent changes across the devices, as multiple administrators may modify the services in parallel.

In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, NM System devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

SUMMARY

In general, this disclosure describes techniques for managing network devices. A network management system (NMS) device may configure network devices using configuration data, e.g., expressed in Yet Another Next Generation (YANG) data modeling language. The configuration data model may be a low-level (e.g., device-level) configuration data model, a service model, an inventory model, or the like. Thus, the data model may be any YANG model. Moreover, the NMS device may manage the network devices based on the configuration data for the network devices. According to the techniques of this disclosure, the NMS device may translate the high-level and/or low-level configuration data into a graph database. The NMS device may then handle YANG operations through graph queries into the graph database. Moreover, the NMS device may perform network service management functions through overlay graph functions, which may support operations in near real time. The NMS device may provide support for plugins or upload new graph functions, provide efficient transformation using graph functions, and provide the ability to handle draft changes within the graph to support high performance.

In one example, a method includes retrieving data representing a data model for a plurality of network devices managed by a network management system, constructing a GraphQL model having a plurality of nodes, each of the nodes corresponding to one of the network devices according to the data model, storing data representing properties of the network devices associated with corresponding nodes of the GraphQL model according to the data model, receiving a GraphQL query including data representing at least one query property, determining which of the nodes has a property matching the at least one query property, and returning data identifying which of the network devices corresponds to the nodes having the property matching the at least one query property.

In another example, a device of a network management system includes a memory configured to store data representing a data model for a plurality of network devices managed by the network management system, and one or more processors implemented in circuitry and configured to: retrieve the data representing the data model, construct a GraphQL model having a plurality of nodes, each of the nodes corresponding to one of the network devices according to the data model, store data representing properties of the network devices associated with corresponding nodes of the GraphQL model according to the data model, receive a GraphQL query including data representing at least one query property, determine which of the nodes has a property matching the at least one query property, and return data identifying which of the network devices corresponds to the nodes having the property matching the at least one query property.

In another example, a computer-readable storage medium has stored thereon instructions that, when executed, cause a processor of a management device that manages a plurality of network devices of a network management system to retrieve data representing a data model for the plurality of network devices, construct a GraphQL model having a plurality of nodes, each of the nodes corresponding to one of the network devices according to the data model, store data representing properties of the network devices associated with corresponding nodes of the GraphQL model according to the data model, receive a GraphQL query including data representing at least one query property, determine which of the nodes has a property matching the at least one query property, and return data identifying which of the network devices corresponds to the nodes having the property matching the at least one query property.

The details of one or more examples are set forth in the accompanying drawings and the description below. Other features, objects, and advantages will be apparent from the description and drawings, and from the claims.

DETAILED DESCRIPTION

Figure 1:
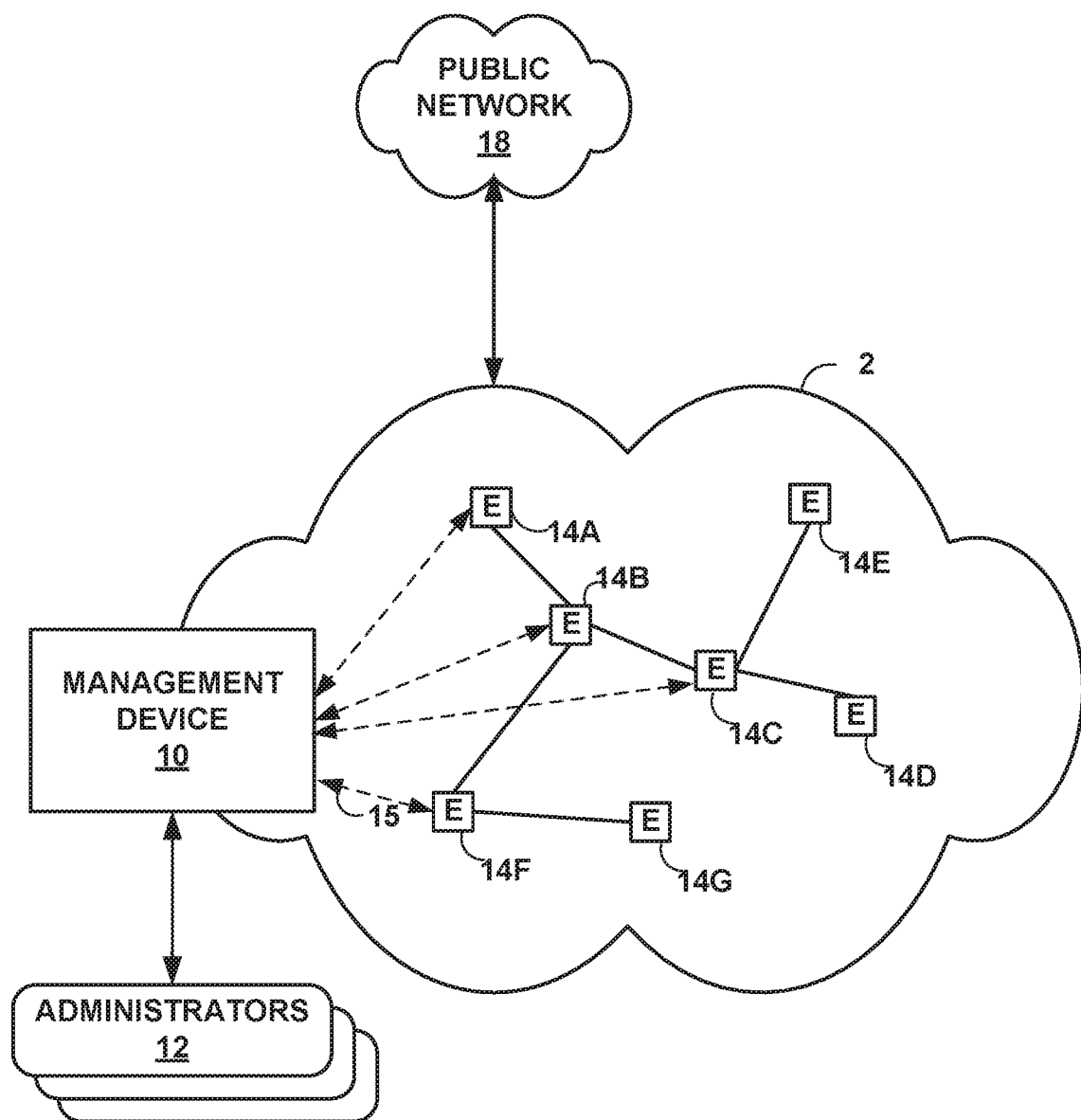
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to the various elements 14. Once elements 14 are deployed and activated, administrators 12 uses management device 10 (or multiple such management devices) to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS device, and elements 14 are centrally maintained by an IT group of the enterprise. Administrators 12 interacts with management device 10 to remotely monitor and configure elements 14. For example, administrators 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element HF, using management device 10, to directly configure element 14F. In this manner, a user can provide commands in a format for execution directly to elements 14.

Further, administrators 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrators 12 uses management device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

Management device 10 may be configured to compare a new set of high-level configuration data to an existing (or old) set of high-level configuration data, determine differences between the new and existing sets of high-level configuration data from the comparison, and apply the translation functions to the differences between the new and old high-level configuration data. In particular, management device 10 determines whether the new set of configuration data includes any additional configuration parameters relative to the old set of high-level configuration data, as well as whether the new set of configuration data modifies or omits any configuration parameters that were included in the old set of high-level configuration data.

Either or both of high-level configuration data and low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. Management device 10 includes various translation functions for translating the high-level configuration data differences. These functions are configured accept the high-level configuration data (which may be expressed as structured input parameters, e.g., according to YANG). The functions are also configured to output respective sets of low-level device configuration data changes, e.g., device configuration additions and removals. That is, $y_1=f_1(x)$, $y_2=f_2(x)$, . . . $y_N=f_N(x)$. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

In general, management device 10 maintains working drafts of candidate configurations to be applied to elements 14, prior to committing configuration changes to elements 14, e.g., in a private data store. In this manner, management device 10 maintains a private copy of a high level model (HLM) of configuration information, a low level model (LLM) of configuration information, and device raw configuration information for elements 14. Once a draft of configuration information is committed to the network, management device 10 may persist the HLM and LLM changes in an application data store. There may be multiple levels of service abstractions. For example, there may be higher-level services, base service elements, and the like.

Management device 10 may use YANG modeling for high-level services and low-level device configuration models. This data may contain relations across YANG entities, such as list items and containers. Conventionally, NMS devices do not support configuration management functions in real time. In accordance with the techniques of this disclosure, as discussed in greater detail below, management device 10 may convert a YANG data model into a database model, and convert YANG validations into data validations.

This disclosure recognizes that a simple create, read, update, and delete (CRUD) based database layer is so rigid that, at times, a caller in a business layer ends up fetching more data from the database than is required. This may reduce execution speed of functionalities. Many functionalities are common for all NMSs, such as a private configuration data store, translation of configuration data from high-level configuration information to low-level configuration information, and other functionalities. These functionalities may be part of a common platform on top of the database layer.

In some cases, data needs to be stored in the form of binary large objects (BLOBs). For example, private data stores for configuration data may be stored as BLOBs. Filtering, sorting, and indexing data of a BLOB is generally difficult.

In some cases, if a resource is shared across two higher-level model instances, deletion of one higher-level service should result in deletion of a corresponding lower level instance, if the low-level resource is not used by any other higher model. Likewise, deletion of one higher-level service should not result in deletion of a low-level instance if the low level resource is used by another higher-level instance. Such checking of whether a low-level instance is used by a higher-level instance is typically handled in a business layer of NMS devices, such as management device 10, which may result in multiple round trip checks to a corresponding database.

NMS devices that support a private data store persist private copies of data in the private data store separately, until the private copy is committed to a database. Data change requests in one draft may need to be checked for conflicts with other drafts and persist the changes. The data change requests may happen in the business layer. As such, the conflicts detection does not happen in real time. Examples of techniques for detection of conflicts across multiple proposed changes to configuration data is discussed in greater detail in Chandrasekhar et al., "PROCESSING MULTIPLE PARALLEL HIGH LEVEL CONFIGURATION CHANGES FOR MANAGED NETWORK DEVICES," U.S. application Ser. No. 15/396,262, filed Dec. 30, 2016, the entire contents of which are hereby incorporated by reference.

To address the issues discussed above, in some examples, management device 10 may implement a thin layer over a graph database, which captures common NMS functionalities, such as those discussed above. Management device 10 may also provide techniques for extending this thin layer and to add more functionalities, if desired.

In accordance with the techniques of this disclosure, management device 10 may attach network management service functions to graph database vertices to support operations in near real-time. In this approach, the graph database may be used for a YANG data model, and NETCONF operations may be performed through graph operations. Some of the configuration management functions that management device 10 may attach to the graph database include data model constraints on data (restricting the appearance or value of nodes based on the presence or value of other nodes in the hierarchy), model transformations, private data copy support, resource assignment, out of band (OOB) changes handling, and/or reference object handling. In addition, management device 10 may provide methods for attaching new functions to the graph database.

In particular, with respect to constraints on the data, YANG provides semantics of the data. There may be constraints on either or both of vertex properties and/or edge properties. The validation on the properties may enforce the validations, while setting the values to vertex nodes. Constraints may include, for example, "must," "mandatory," min-elements," and "max-elements" "when," or "if-feature," and management device 10 may enforce these constraints at the database level.

With respect to model transformations, when a service model is created and/or updated, management device 10 may execute a transformation process to translate service data across layers and generate device configuration. Management device 10 may attach translation rules as a network function to graph vertices. This approach may enable parallelism in transformation, so that service changes can be translated in near real time. Based on a mapper, management device 10 may derive the functions and attach the functions to the vertices.

With respect to private data copy support, management device 10 may support multiple parallel changes for the same configuration services. Configuration management performed by management device 10 may use multiple layers of configuration models. Operators may be operating in different layers of the model. Management device 10 may detect collisions at various levels and provide views for collisions and proposed solutions.

With respect to resource assignment (or shared resource management), if a resource is shared across two higher-level model instances, deletion of one higher-level service should result in management device 10 deleting a low-level instance if the low-level resource is not used by any other higher model, but should not result in management device 10 deleting the low-level instance if the low-level resource is used by another higher-level instance.

With respect to reference object handling, in a data model, an object may refer to another object. Management device 10 may model such references as leafrefs. In those cases, management device 10 may delete the referenced objects. This can be attached as a function to the graph database.

Management device 10, like other network management systems, may use a low-level configuration model, such as a YANG model, for high-level service and low-level device configuration and resources. References across these data models may be represented through leafrefs. Such references can be represented as a graph data model, as discussed herein. Applications may have requirements to query data across YANG data models. In conventional systems, applications would issue multiple resource application programming interface (API) calls and run business logic to get filtered information resulting from such queries.

Furthermore, applications may use a document database to support sorting, searching, and filtering. When an application receives a filter request (e.g., a GraphQL query), the filter may be applied to the document database.

In accordance with the techniques of this disclosure, management device 10 may support querying to obtain one or more filtered objects from a graph database, such as a YANG data modeled objects graph. Management device 10 may also provide a GraphQL interface to interact with the YANG data modeled graph. GraphQL is described at graphql.org. In some examples, management device 10 may create a GraphQL schema from the configuration model, which may again be expressed in YANG. Furthermore, management device 10 may generate a document database schema from the YANG data model. Moreover, management device 10 may translate GraphQL queries into graph database queries, which it then issues to the graph database to determine elements of the graph database matching the received query.

Figure 2:
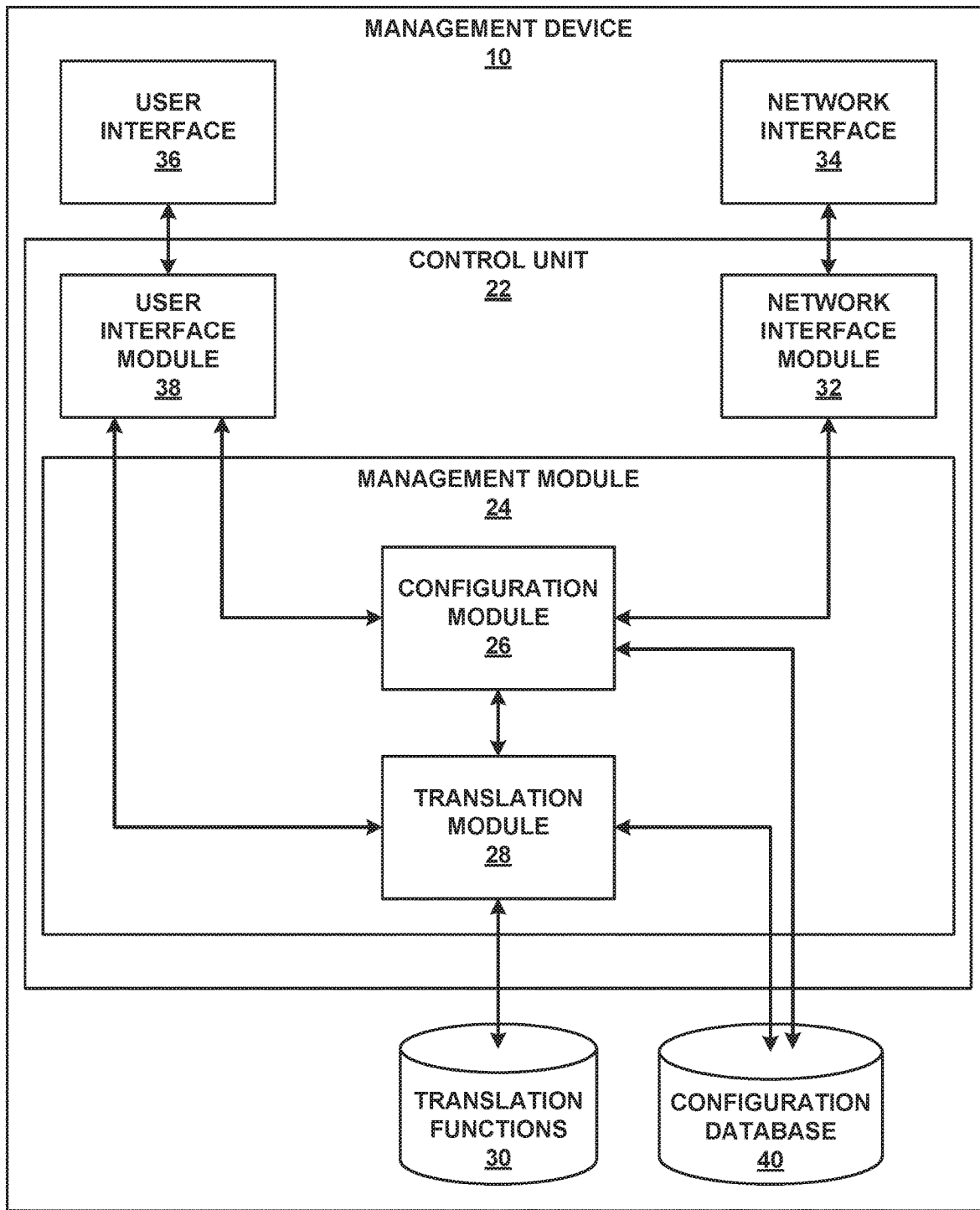
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrators 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive high-level configuration instructions for a set of managed network devices from a user, such as administrators 12. Over time, the user may update the configuration instructions, e.g., to add new services, remove existing services, or modify existing services performed by the managed devices. The high-level instructions may be structured according to, e.g., YANG. In some examples, management module 24 also provides the user with the ability to submit translation functions that translation module 28 executes to transform high-level configuration instructions to device-specific, low-level configuration instructions, as discussed below.

Management device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., high-level configuration information, or in some cases, both high-level configuration and low-level configuration information) for the managed devices (e.g., elements 14). In accordance with the techniques of this disclosure, configuration database 40 may include one or more sets of public or private HLM configuration, LLM configuration, and/or device level configuration.

Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions.

Configuration module 26 may first determine an existing set of high-level configuration information for each service performed by the devices for which configuration is to be updated, e.g., by retrieving the existing set of high-level configuration information for each of the services from configuration database 40. Configuration module 26 may then compare the existing set of high-level configuration information to the newly received set of high-level configuration information, and determine differences between the existing and newly received sets of high-level configuration information. Configuration module 26 may then pass these differences to translation module 28, for translation into respective sets of low-level configuration information. Configuration module 26 also updates the existing high-level configuration information recorded in configuration database 40 based on the newly received set of high-level configuration information.

As discussed above, a user, such as administrators 12, may create different translators for data creation, data updates, and data deletions. This disclosure describes translation techniques based on an appreciation that an "update translator" needs to check modified variables in the high-level configuration information, and update the corresponding configuration in the low-level configuration model(s). When updating the low-level configuration information, the translator should not only rely on the high-level difference data, because unchanged data of the high-level configuration data may need to be read to properly change the low-level configuration data. Thus, the techniques of this disclosure may simplify update and/or delete translators for translating high-level configuration data to low-level configuration data. In some examples, the "create" translator may be used to perform update and/or deletion translations as discussed below.

In some examples, translation functions 30 that perform update translations (that is, translating changes in high-level configuration data that results in updates to values of low-level configuration information, without creation or deletion of elements in the low-level configuration data) may operate as follows. In one example, the translation functions 30 that perform updates may override single elements. That is, performance of these translation functions may result in deletion of an element value, e.g., by replacing an old element value with a new value. Sometimes, a single value in a configuration service model can be mapped to a list in a device configuration. In these cases, translation module 28 may send the old value as well as the new value.

For example, a leaf element in a high-level model (FILM) may be mapped to a list of elements in a low-level model (LLM) for device-level configuration information. Suppose the HLM element has the name "VLAN name" but in LLM, the corresponding element is named "list." If a user modifies the FILM object by replacing the name "VLAN name" with a new name (e.g., "new VLAN name"), the translation function would need to delete "VLAN name," otherwise a stale entry would be retained in the lower-level configuration information. Moreover, translation functions 30 that perform updates may cause translation module 28 to update lists by adding new entries as needed, and deleting old entries.

Translation module 28 (which may be configured according to translation functions 30) may use the same translation template for creation, updates, and deletion of high-level configuration instructions. Translation module 28 may be configured to allow processing of only impacted high level data changes (i.e., those elements in the high-level configuration information that are impacted by the changes). Based on the translator logic, translation module 28 may infer dependencies across HLM elements in the high-level model, and the corresponding elements. When the high-level configuration information is changed, translation module 28 may generate a difference between existing high-level configuration information and new high-level configuration information. This difference may account for the dependencies in the LLM elements. Thus, when calculating the difference, translation module 28 may determine the difference as well as information used to process the difference, e.g., based on the dependencies. Translation module 28 may execute one of translation functions 30, providing the determined information (differences and dependencies) to the executed one of translation functions 30 as input.

When a "create" template is uploaded (that is, a translation function of translation functions 30 that processes new data in high-level configuration information, relative to existing high-level configuration information), translation module 28 may determine the dependencies across elements within the high-level configuration information. These dependencies may be based on service-to-device configuration mappings. When the service is changed, translation module 28 may generate a difference between the existing high-level configuration information and the new high-level configuration information, based on the dependencies. Translation module 28 may then use the "create" template (the translation function of translation functions 30) to process the difference, and thereby translate the high level configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with management device 10, it should be understood that other interfaces may be used in other examples. For example, management device 10 may include a representational state transfer (REST) client (not shown) that may act as an interface to another device, by which administrators 12 may configure management device 10. Likewise, administrators 12 may configure elements 14 by interacting with management device 10 through the REST client.

In accordance with the techniques of this disclosure, management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top level container, as vertices in a graph database.

In particular, management module 24 may model a list node in a YANG model as a vertex of the graph database. "Min-elements" and "max-elements" place constraints on edges between parent vertices and list node vertices. Management module 24 may model leaf nodes, leaf lists, and the like as properties of the vertices.

Management module 24 may also model container attributes as parent vertex attributes. Management module 24 may specify a container name preceding the attribute name. For example, the following is an example YANG container.

```
list p2p {
    key name;
    leaf name { type string;}
```

```
container bandwidth-settings {
    leaf bandwidth-limit { type uint32;}
    leaf burstsize-limit { type uint32;}
    }
}
```

In this example, management module 24 would model p2p as a vertex and specify attributes of the vertex as including the attributes "name," "bandwidth-settings/bandwidth-limit," and "bandwidth-settings/burstsize-limit."

Management module 24 may model containers with presence as a parent vertex attribute. Management module 24 may model all features as part of a feature vertex. In particular, management module 24 may construct a single feature vertex, and specify each of the YANG features as a corresponding attribute of the feature vertex. Management module 24 may further specify values for the attributes to signify whether the feature is supported or not. Management module 24 may further model a top level YANG container as a vertex of the graph database.

Management module 24 may further connect the various vertices discussed above using edges to form the graph database. Management module 24 may use two kinds of edges: containment edges and reference edges. Containment edges may also be referred to as "has-edges." That is, when an element corresponding to a first vertex "contains" an element corresponding to a second vertex (and thus, the first vertex "has" the second vertex), management module 24 may connect the first vertex to the second vertex using a containment edge, or has-edge. Thus, a vertex containing another vertex brings the "has" relation across the vertices. As another example, list to list containment brings the "has-edge" relation between vertices to which the list elements correspond, where management module 24 may construct such edges between these vertices. If management module 24 deletes a parent vertex, management module 24 may also automatically delete child vertices associated with has-edges of the parent vertex. Management module 24 may construct reference edges between vertices as well. A leaf-reference may bring the reference edge between the vertices and capture a "refer" property.

Management module 24 may model an "ordered by user" attribute on a vertex as an "edge property"-"order" between a parent vertex to a current vertex. Management module 24 may specify an integer value for the attribute.

YANG specifies semantics for data. Such semantics may impose constraints on vertex properties and edge properties of a graph database modeled after YANG data. Management module 24 may perform a validation process on properties of the vertices and edges to enforce validations. Management module 24 may also set values to vertex nodes, e.g., as part of the validation process.

After constructing a graph database as discussed above, management module 24 may perform operations on data of the graph database. For example, management module 24 may map Netconf-based operations, such as get-config, get-config with filters, and edit-config, to graph database queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics. In addition, in accordance with the techniques of this disclosure, management module 24 may translate received GraphQL queries into graph database queries, such as Gremlin queries.

Management device 10 further, according to the techniques of this disclosure, uses a YANG data model for services and resources, and provides mechanisms for applying filters on these objects while fetching filtered information (e.g., according to a query). The filter may support traversing the data model based on conditions, fetching selective properties, and pagination. Management module 24 may implement support for RESTConf (per Bierman et al., "RESTCONF Protocol," Internet Engineering Task Force (IETF), RFC 8040, January 2017, available at tools.i.etf.org/html/rfc8040). RESTConf supports content, depth, and fields, but does not support filtering based on conditions, and does not support fetching information across YANG modules. Thus, in other examples, management device 10 may accept GraphQL queries, as a replacement for RESTConf.

Management device 10 may initially receive a GraphQL query as part of a request, e.g., via user interface 36 or interwork interface 34. The query may contain YANG data model paths and conditions on properties, follow a GraphQL syntax, and include leafref handling. For example, for leafref handling, referred-to objects may be directly referenced within a referring object. After receiving the query, management module 24 may generate a graph query from the GraphQL query, where the graph query is expressed in a domain-specific language (DSL).

The techniques of this disclosure may provide various advantages. For example, YANG is a hierarchical data model, and GraphQL supports hierarchical data models. These techniques allow for only a single API call to be used to fetch filtered information, rather than multiple API calls, thereby reducing computational load and improving computing performance. These techniques allow for inclusion of conditions when traversing a query. The query may further define a graph shape and may be strongly typed.

To generate a GraphQL schema, management module 24 may convert YANG data types to corresponding GraphQL schema data types as shown in Table 1:

TABLE 1

| YANG | Graph QL schema |
|---|---|
| Type: scalar | |
| Integer | Int |
| Decimal64 | Float |
| String | String |
| Boolean | Boolean |
| Enum | Enum |
| Bit | custom-defined Scalar type |
| Binary | custom-defined Scalar type |
| Leafref | Custom defined scalar type: type leafref{, name: String age: Int picture: Url }. |
| Identityref | custom-defined |
| Empty | Empty |
| instanceidentifier | custom-defined |
| Grouping | interface |
| Union | Union |

Management module 24 supports GraphQL queries based on the generated schema. A GraphQL query may contain YANG data model paths and conditions on properties, as well as leafref handling information, where referred-to objects can be directly referenced within a referring object.

Management module 24 may also perform mutations of the GraphQL schema, based on the generated schema. The mutation may contain the YANG data model paths and conditions on properties.

In some examples, management module 24 may generate a document database to support sorting, searching, and filtering. In particular, management module 24 may generate a document database schema from a YANG data model. Management module 24 may run a filter query on a document database. In particular, management module 24 may model a YANG list with entity extension as a vertex, and management module 24 may model each vertex as a document of the document database. Management module 24 may set leaf node, leaf list, and other such elements as properties of the document. Management module 24 may also generate document properties datatypes from YANG leaf datatypes.

Management module 24 may determine that a vertex containing another vertex has containment edge or "has-edge," and bring the "has" relation across the vertices. Management module 24 may generate a document for the child vertex to contain a parent property that has a parent vertex identifier, e.g., fully qualified name (fq-name). Likewise, management module 24 may generate a document for the parent vertex to contain a children property that will have a child vertex identifier, e.g., fully qualified name (fq-name).

Management module 24 may determine that two leaf vertices have a reference edge (ref-edge) between them. Management module 24 may bring the ref-edge of a leaf-ref is between the vertices. Management module 24 may generate one document for one vertex having a reference edge to another vertex to have a back-ref property for the referred-to vertex document and contain an identifier for the referred-to vertex, e.g., fully qualified name (fq-name). Management module 24 may also generate one document for a referred-to vertex to have a reference property to a referring vertex document and contain an identifier for the referring vertex, e.g., fully qualified name (fq-name).

Figure 3:
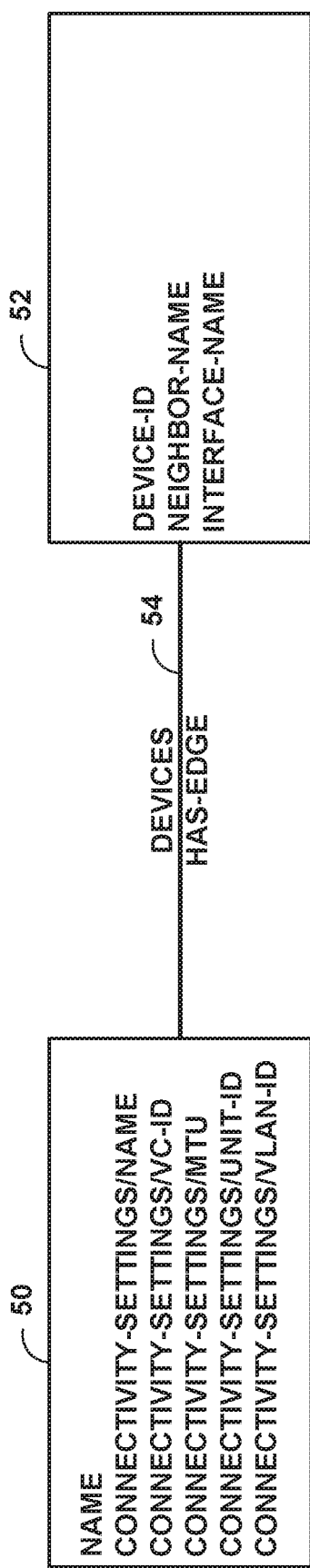
FIG. 3 is a conceptual diagram illustrating an example set of vertices and edges of a graph database.

FIG. 3 is a conceptual diagram illustrating an example set of vertices and edges of a graph database. In the example of FIG. 3, vertex 50 represents an example of a vertex corresponding to a service module, vertex 52 represents an example of a vertex corresponding to a device, and devices edge 54 is a has-edge representing that a service module corresponding to vertex 50 "has" one or more devices conforming to the data of vertex 52. Management module 24 of FIG. 2 may construct vertices 50, 52 and devices edge 54 based on the example YANG Patch operation for a YANG model shown below, or based on a YANG Create operation:

```
module: service
  +--rw service* [name]
    +--rw name                    string
    +--rw connectivity-settings
    | +--rw name?                 string
    | +--rw vc-id?                uint32
    | +--rw mtu?                  uint32
    | +--rw unit-id?              uint32
    | +--rw vlan-id?              uint32
    +--rw devices
      +--rw device* [device-id]
        +--rw device-id           string
        +--rw neighbor-name?      string
        +--rw interface-name      string
```

As shown in the YANG data above, the example service module includes a name, and connectivity settings including name, vc-id, unit-id, and elan-id. Thus, management module 24 constructs vertex 50 to include attributes of name, connectivity-settings/name, connectivity-settings/vc-id, connectivity-settings/mtu, connectivity-settings/unit-id, and connectivity-settings/vlan-id. In addition, the service module as shown above includes one or more devices, each of which has attributes of device-id, neighbor-name, and interface-name. Thus, management module 24 constructs vertex 52 to include attributes of device-id, neighbor-name, and interface name. Management module 24 also constructs devices edge 54 as a has-edge from vertex 50 to vertex 52, to represent that the service module "has" one or more devices as shown above.

An example patch request for the model of FIG. 3 is:

```
<service xmlns="http:www.example.com/ns/ncs" xmlns:svc="http:www.
example.com /ns/ncs">
    <name>p2p1</name>
    <connectivity-settings>
        <unit-id nc:operation="delete">915</unit-id>
        <vlan-id nc:operation="delete">2467</vlan-id>
    </connectivity-settings>
    <devices>
        <device>
            <device-id nc:operation="create">10.1.1.1</device-id>
        </device>
    </devices>
</service>
```

Management module 24 may generate the following Gremlin graph query for the example data above:

v=g.v("p2p1");
v. removeProperty(connectivity-settings/unit-id)
v. removeProperty(connectivity-settings/vlan-id)
d=g.addVertex([device-id:'10.1.1.1']);
g.addEdge(v,d,'has-edge',[path:'devices'])

Figure 4:
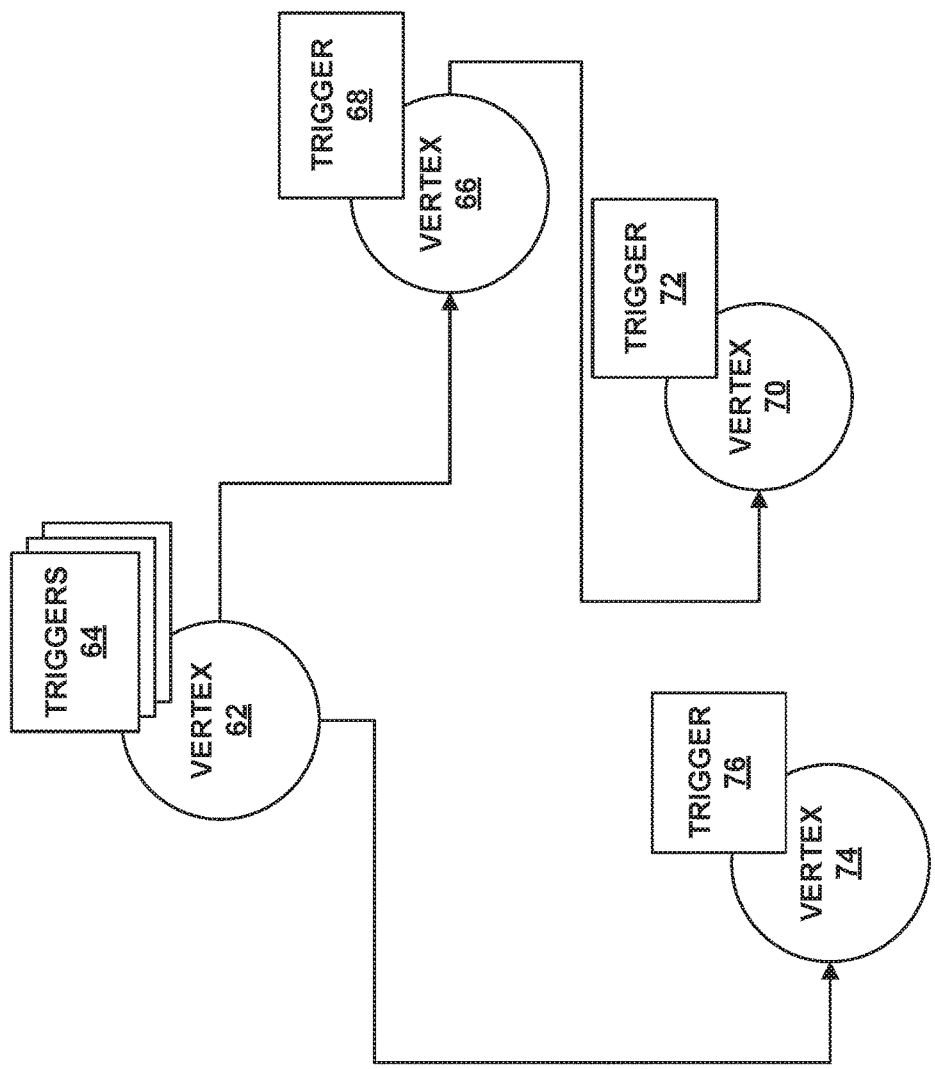
FIG. 4 is a conceptual diagram illustrating examples of vertices with attached triggers.

FIG. 4 is a conceptual diagram illustrating examples of vertices with attached triggers. In particular, the example of FIG. 4 illustrates graph 60, including vertices 62, 66, 70, and 74. Vertex 62 includes triggers 64, vertex 66 includes trigger 68, vertex 70 includes trigger 72, and vertex 74 includes trigger 76.

Management module 24 (FIG. 2) may manage the complete life cycle of a managed service using a graph, such as graph 60. Management module 24 may support configuration management functionalities as discussed above through graph database overlay functions. Such functions may follow reactive programming principles. Processing according to reactive programming principles may include management module 24 specifying a "define (condition)" element, a "watch (trigger)" element, a "react (function)" element, and a "target" element. The "watch (trigger)" elements are represented in graph 60 by triggers 64, 68, 72, 76.

The "define (condition)" element may contain one or more expressions. The expressions could be value changes in a column or a valid, executable expression. The (condition) argument is optional. The condition argument can be a Python script. If management module 24 specifies the condition argument as a Python script, management module 24 may further construct a class for the script, and construct two methods for the class: a filter( ) method and a watches( ) method. Management module 24 constructs the filter( ) method to contain the actual condition, and the watches( ) method to return the attributes used in the condition. If expressions are used, management module 24 reads condition attributes from the expression directly.

When management module 24 executes the "watch (trigger)" element, management module 24 parses the "define" expression and watches resulting changes of properties.

Management module 24 executes the function specified in "react (function)" when the react condition is met. Management module 24 modifies attributes as specified in the "target" element in response to the "react" function, as part of the "react."

Management module 24 supports registering new "react" functions to the database program overlay. Management module 24 may add a new "react" function to the overlay. A function caller should also provide a list of target attributes that will be affected by applying the "react" function. The database program overlay may also include a list of inbuilt react functions as explained below.

In some examples, management module 24 performs configuration service management using functions as discussed above for the following tasks: enforcing constraints on data, private data store support, translations (e.g., from high-level configuration information to low-level configuration information), resource allocation, and handling of out-of-band (OOB) changes. These tasks are explained in greater detail below.

Management module 24 may enforce constraints on data of configuration database 40. For example, management module 24 may construct a "define (condition)" element and a "watch" attribute for a YANG "when" condition Xpath statement. Furthermore, management module 24 may construct the "react (function)" element to set the property of vertex/vertex/edge based on the Xpath evaluated value.

As an example, management module 24 may enforce the "when" condition in the example model data below:

```
augment /system/login/user {
    when "class != 'wheel'";
    leaf uid {
        type uint16 {
            range "1000 .. 30000";
        }
    }
}
```

In this example, the condition is "class !=wheel," that is, class is not equal to wheel. For this example, management module 24 would generate a "watch" element on "class," and a function of "enable uid." Thus, when a class for a user is not equal to "wheel," the "watch" element trigger tires, causing management module 24 to execute the "enable uid" function, which instantiates a leaf node "uid" in the graph database for the user.

As another example, management module 24 may perform a choice statement as a condition enforcement. Management module 24 may generate conditions for all attributes found inside a YANG case statement in choice, and execute a function to set attributes of other case statements to "null." For example, management module 24 may process the choice statement below:

```
Choice aa {
    Case bb1 {
        leaf d { type string};
        leaf e { type string},
    }
    Case bb2 {
        leaf d1 { type string};
        leaf e1 { type string},
    }
}
```

Management module 24 may produce the following conditions from the "choice" example above:

If(d !=null e||e!=null)//Condition for case bb1
If(d1!=null||e1!=null)//Condition for case bb1

Management module 24 may implicitly handle a hierarchy of the constrains (e.g., must, mandatory, min-elements, Max-elements), as the parent vertex would not be created if the parent nodes with "when/if-feature" are not satisfied.

As discussed above, translation module 28 of management module 24 translates high-level configuration information into low-level, that is, device-level, configuration information. In accordance with the techniques of this disclosure, translation rules executed by translation module 28 may be attached to a graph vertex as a network function. Thus, when a high-level configuration service model is created or updated, translation module 28 may translate the high-level service data across layers and generate low-, device-level configuration information. Attaching the translation rules to respective vertices in the graph database may enable translation parallelism, such that service changes can be translated in near real time. Based on a mapper used for translation, management module 24 derives translation functions and attaches these functions to respective vertices of the graph database of configuration database 40.

The following is an example high level model for a service module:

```
module: service
   +--rw service* [name]
      +--rw name                  string
      +--rw connectivity-settings
      |  +--rw name?              string
      |  +--rw vc-id?             uint32
```

-continued

```
      |  +--rw mtu?                         uint32
      |  +--rw physical-if-encapsulation?   string
      |  +--rw logical-if-encapsulation?    string
      |  +--rw traffic-type?                string
      |  +--rw unit-id?                     uint32
      |  +--rw vlan-id?                     uint32
      +--rw bandwidth-settings
      |  +--rw bandwidth-limit?   uint32
      |  +--rw burstsize-limit?   uint32
      +--rw devices
         +--rw device* [device-id]
            +--rw device-id       string
            +--rw neighbor-name?  string
            +--rw interface* [name]
               +--rw name   string
```

Translation module 28 may translate the high level model above into the low-level model below:

```
module: configuration
   +--rw configuration
      +--rw interfaces
      |  +--rw interface* [name]
      |     +--rw name                  string
      |     +--rw flexible-vlan-tagging?   empty
      |     +--rw mtu?                  uint32
      |     +--rw encapsulation?        enumeration
      +--rw protocols
         +--rw l2circuit
            +--rw neighbor*
               +--rw name?   string
               +--rw interface* [name]
                  +--rw name                         interface-name
                  +--rw virtual-circuit-id           uint32
                  +--rw no-control-word?             empty
                  +--rw ignore-encapsulation-mismatch?  empty
```

An example mapper for translating the high level model to the low level model is:

```
<template>
   <device>
      <device-id>{/service/devices/device/device-id}</device-id>
      <configuration>
         interfaces loop-context="interface">
            <interface>
               <name>{name}</name>
               <flexible-vlan-tagging/>
               <mtu>{/service/connectivity-settings/mtu}</mtu>
               <encapsulation>{/service/connectivity-settings/physical-if-
                  encapsulation}</encapsulation>
            </interface>
         </interfaces>
         <protocols>
            <l2circuit>
               <neighbor>
                  <name>{neighbor-name}</name>
                  <interface loop-context="interface">
                     <name>{name}</name>
                     <virtual-circuit-id>{/service/connectivity-settings/vc-id}</virtual-
                        circuit-id>
                     <no-control-word/>
                     <ignore-encapsulation-mismatch/>
                  </interface>
               </neighbor>
            </l2circuit>
         </protocols>
      </configuration>
   </device>
</template>
```

Management module 24 may generate the graph transformation functions below from the example mapper above. First, management module 24 may generate a device vertex function. Management module 24 may associate the device vertex function with every device(service/devices/device) in the high level model. Management module 24 may generate a watch on neighbor-name, interface, and/service/connectivity-settings/vc-id, and a react function of the example template below:

```
<template>
  <device>
    <device-id>{device-id}</device-id>
    <configuration>
      <protocols>
        <l2circuit>
          <neighbor>
            <name>{neighbor-name}</name>
            <interface loop-context="interface">
              <name>{name}</name>
              <virtual-circuit-id>{/service/connectivity-settings/vc-id}</virtual-circuit-id>
              <no-control-word/>
              <ignore-encapsulation-mismatch/>
            </interface>
          </neighbor>
        </l2circuit>
      </protocols>
    </configuration>
  </device>
</template>
```

Management module 24 may also generate an interface vertex function, and associate the function with every interface(service/devices/device/interface) in the high level model. Management module 24 may also generate a watch on interface/service/connectivity-settings/mtu, and a react function of the example template below:

```
<template>
  <device>
    <device-id>{device-id}</device-id>
    <configuration>
      <interfaces>
        <interface>
          <name>{name}</name>
          <flexible-vlan-tagging/>
          <mtu>{/service/connectivity-settings/mtu}</mtu>
          <encapsulation>{/service/connectivity-settings/physical-if-encapsulation}</encapsulation>
        </interface>
      </interfaces>
    </configuration>
  </device>
</template>
```

Management module 24 may also support a private data store. Management device 10 may use the private data store to support multiple parallel changes for the same configuration services. Configuration management may have multiple layers of configuration models. Operators could be operating on different layers of the model in parallel. Management module 24 may detect collisions at various levels and provide a view for collisions, and provide solutions for the collisions. Management module 24 may support private copies of draft changes to configuration database 40 in a private data store. When one or more administrators 12 make changes to vertices in a draft, management device 24 may persist the changes in respective private copies of the graph database.

Management module 24 may provide for multiple parallel changes, e.g., by different ones of administrators 12. As soon as a change is made, management module 24 may automatically detect conflicts across the various drafts in the private data store. Management module 24 may further define unique constraints for the vertices of the graph database, and validate changes for the constraints. To support high performance, management module 24 may persist changes along with the graph, and persist every drafted change for a vertex along with the original vertex.

Table 1 below summarizes the operations. In Table 1, a draft vertex includes a draft id, updated properties (differences), and state, and a draft edge includes a draft id, updated properties (differences), and state.

TABLE 1

|  | Root node | Child node |
|---|---|---|
| Vertex | | |
| Create | New vertex will be created. Draft Ids list will be updated with newly created vertex id and state as new. | New vertex will be created. Create Draft edge between parent and the child with created state. Draft Ids list will be updated with parent vertex id. |
| Update | Create one more Draft node with Diff. Create Draft edge between actual node and draft node. Draft Ids list will be updated with the vertex id. | Same as Root node update |
| Delete | Create one more Draft node with "deleted state". Create Draft edge between actual node and draft node. Draft Ids list will be updated with the vertex id. | Create one more Draft node with "deleted state". Draft Ids list will be updated with parent vertex id. |
| Edge | | |
| Create | NA | Same as "create child" |
| Update | NA | Create Draft edge with updated state between parent and child. Draft Ids list will be updated with parent vertex id. |
| Delete | NA | Same as "delete child" |

Figure 5:
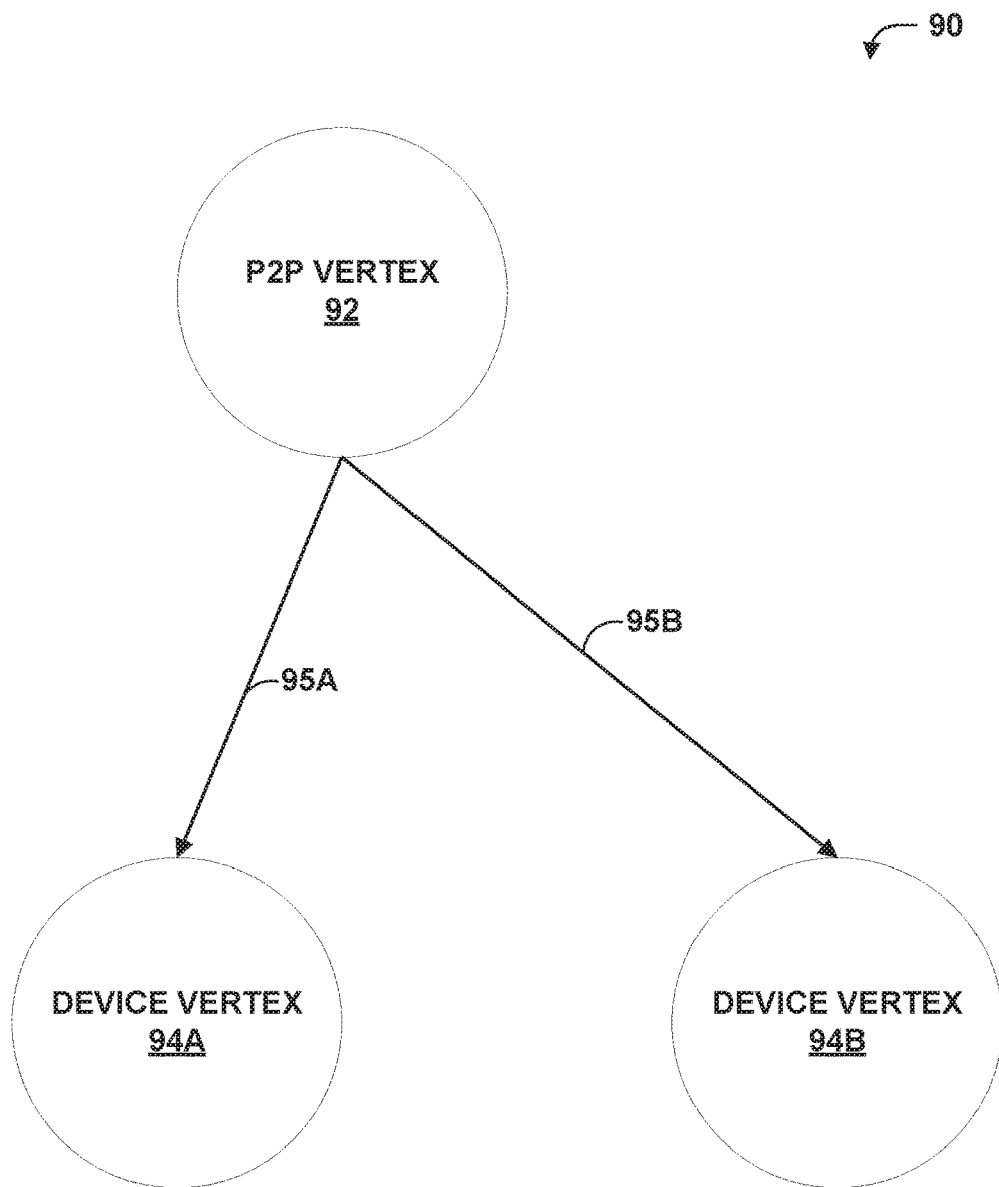
FIG. 5 is a conceptual diagram illustrating an example set of graph database vertices and edges for a peer-to-peer (P2P) managed service.

FIG. 5 is a conceptual diagram illustrating an example set of graph database vertices and edges for a peer-to-peer (P2P) managed service. In particular, management module 24 of FIG. 2 may construct graph model 90 of FIG. 5 for the following example service module defined in YANG:

```
module: service
   +--rw service* [name]
      +--rw name string
      +--rw connectivity-settings
      |  +--rw name?            string
      |  +--rw vc-id?           uint32
      |  +--rw mtu?             uint32
      |  +--rw unit-id?         uint32
      |  +--rw vlan-id?         uint32
      +--rw devices
         +--rw device* [device-id]
            +--rw device-id         string
            +--rw neighbor-name?    string
            +--rw interface-name    string
```

As shown in the above model, the service module includes a set of devices. In the example of FIG. 5, a P2P service according to the service module model above includes two instantiated device vertices, connected by respective "has-edges." With respect to FIG. 5, assuming two devices are initially specified in configuration data, management module 24 constructs P2P vertex 92 to correspond to the P2P managed service, and device vertices 94A, 94B to correspond to the initial set of devices. Management module 24 further connects P2P vertex 92 to device vertices 94A, 94B using respective "has-edges" 95A, 95B.

Figure 6:
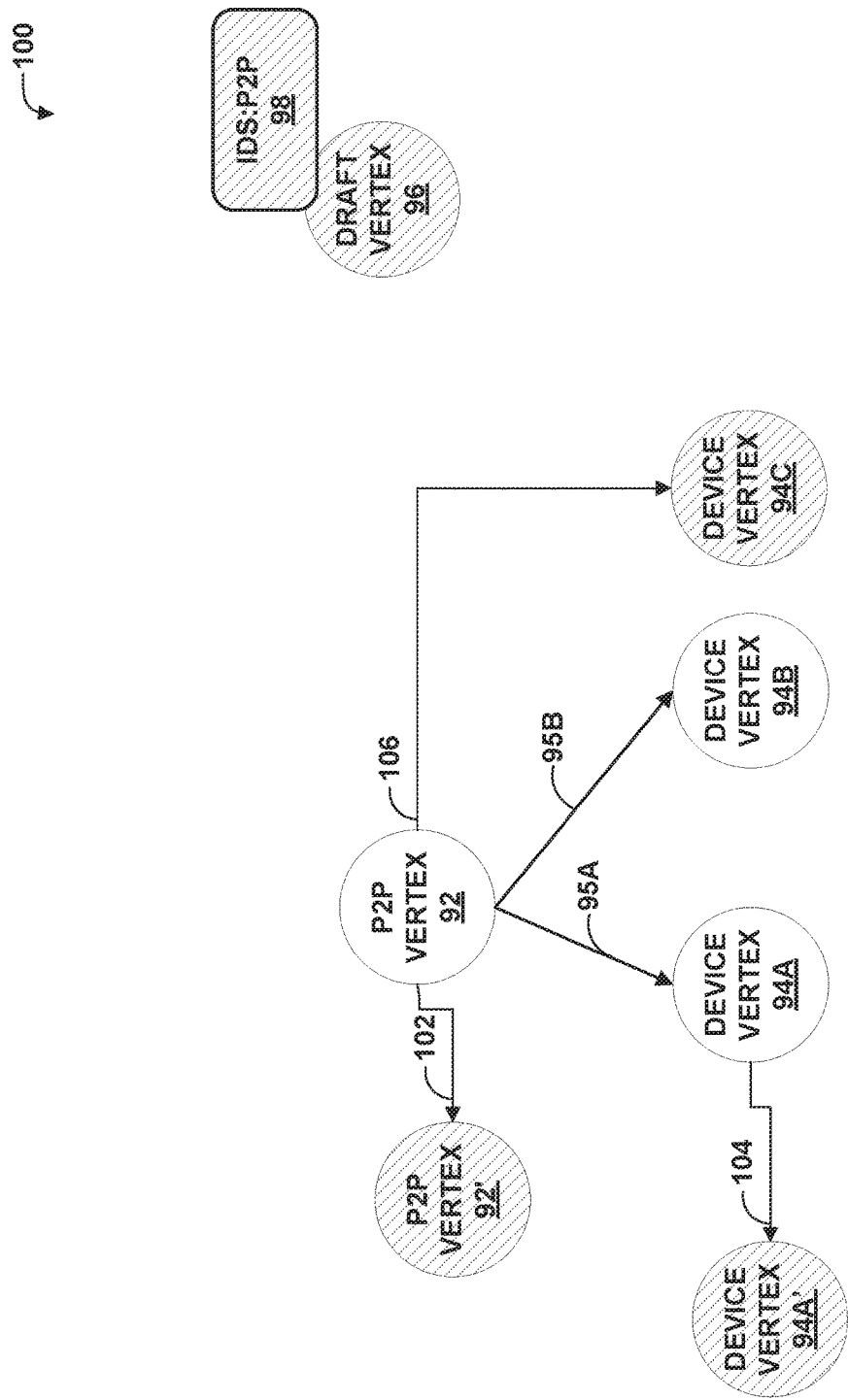
FIG. 6 is a conceptual diagram illustrating draft changes to the graph database elements of FIG. 5 in response to a configuration update.

FIG. 6 is a conceptual diagram illustrating draft changes to the graph database elements of FIG. 5 in response to a configuration update. In particular, FIG. 6 portrays graph 100, which includes P2P vertex 92 and device vertices 94A, 94B coupled to P2P vertex 92 by respective has-edges 95A, 95B, as shown in FIG. 5. However, graph 100 also shows proposed modifications to graph 90 of FIG. 5. That is, in response to a service configuration update (in this example, adding an additional device), management module 24 of FIG. 2 may construct a draft of an update to the graph of FIG. 5, as shown in FIG. 6. In this example, the changes include addition of a third device (represented by device vertex 94C), updating a neighbor-name of the device corresponding to device vertex 94A (resulting in device vertex 94A'), and deletion of bandwidth settings (resulting in P2P vertex 92'). Added and modified vertexes are shown using shading.

Additionally, P2P vertex 92 is connected to P2P vertex 92' by edge 102, device vertex 94A is connected to device vertex 94A' by edge 104, and P2P vertex 92 is connected to device vertex 94C by edge 106. Management module 24 may label each of edges 102, 104, and 106 with "draft id-1" to specify that the connected vertices (P2P vertex 92', device vertex 94A', and device vertex 94C, respectively) are modified by a draft change (namely, draft id-1). Furthermore, management module 24 may specify "op=create" as part of the label for edge 106, indicating that device vertex 94C is to be created, and not simply modified. Graph 100 also includes draft vertex 96 having IDS:P2P trigger 98.

When the draft is committed, management module 24 merges the changes in the draft entity and edge with the actual copy of the graph database in configuration database 40.

Figure 7:
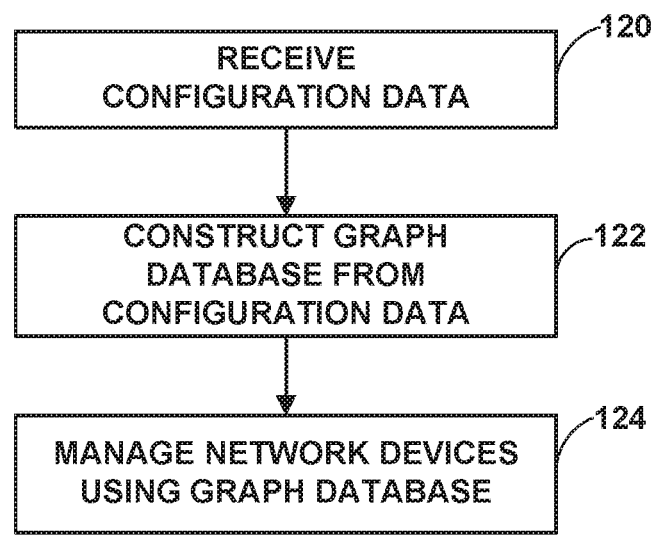
FIG. 7 is a flowchart illustrating an example method for performing techniques of this disclosure.

FIG. 7 is a flowchart illustrating an example method for generating a graph database that may be used when performing techniques of this disclosure. For purposes of example and explanation, the method of FIG. 7 is explained as being performed by management module 24 of FIG. 2. It should be understood that in other examples, other devices and units may be configured to perform these or similar techniques.

Initially, management module 24 may receive configuration data (120) for managed network devices. In some examples, management module 24 may receive high-level configuration data for the managed network devices. In these examples, translation module 28 of management module 24 translates the high-level configuration data into low-level configuration data using translation functions 30. Either or both of the high-level configuration data or the low-level configuration data may be expressed in YANG, as discussed above.

Management module 24 may construct a graph database from the configuration data (122). For example, as discussed above, management module 24 may construct a plurality of vertices representing elements of the configuration data and connect related vertices with edges, such as containment edges (also referred to herein as has-edges) or reference edges. As discussed above, the vertices may represent YANG list elements, YANG container elements (with or without presence), YANG feature elements, and/or a top level container element. In particular, management module 24 may construct a graph database to represent either or both of the high-level configuration data and/or the low-level configuration data.

Management module 24 then manages the network devices using the graph database (124). For example, management module 24 may attach functions to vertices of the graph database, and execute the functions to manage services or other elements corresponding to the vertices in response to the firing of corresponding triggers. Additionally or alternatively, management module 24 may receive updates to the configuration data (e.g., high-level or low-level configuration data), and construct draft changes to the graph database in a private data store. Management module 24 may reconcile conflicts between the draft changes, and either apply the draft changes or reject the draft changes in case the conflicts cannot be reconciled. Management module 24 may further attach translation functions to the vertices of the graph database, which management module 24 may use to translate applicable high-level configuration data changes into low-level configuration data changes for services or other elements corresponding to the vertex to which the translation function is attached.

Figure 8:
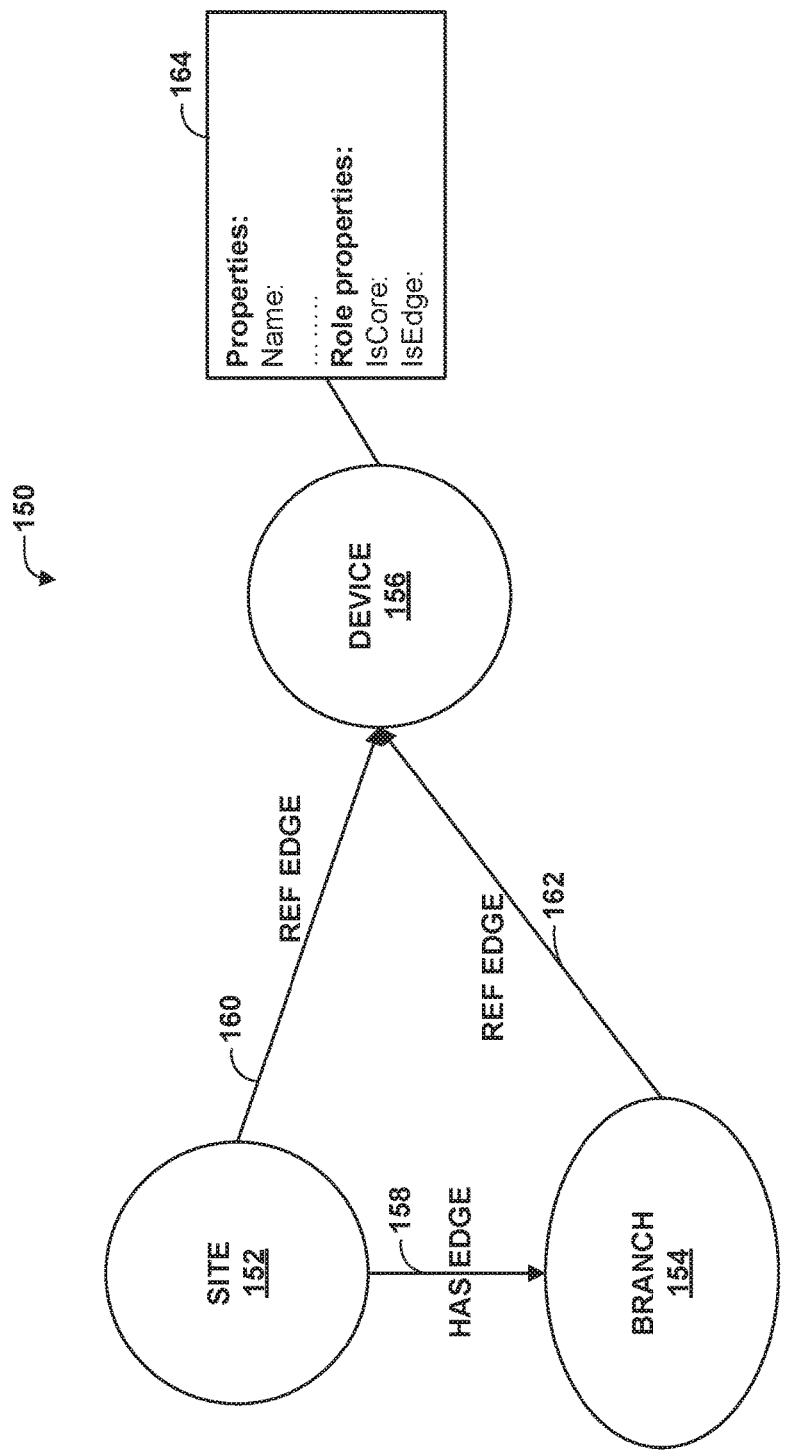
FIG. 8 is a conceptual diagram illustrating an example graph constructed from an example YANG data model in accordance with the techniques of this disclosure.

FIG. 8 is a conceptual diagram illustrating an example graph 150 constructed from an example YANG data model in accordance with the techniques of this disclosure. Management device 10 may construct the example graph 150 of FIG. 8 from the example YANG data model below:

```
Module resources {
   ......
   typedef devicerole{
      type enumeration {
         enum core {
            description "core device";
         }
         enum edge{
            description "edge device";
         }
      }
   }
   list site{
      .....
      list device{
         key device-id;
         leaf device-id {
            type leafref {
               path "/device/device-id";
            }
         }
         leaf role {
            type devicerole;
```

```
        }
    }
    list branch {
        .......
        list device{
            key device-id;
            leaf device-id {
                type leafref {
                    path "/device/device-id";
                }
                leaf role {
                    type devicerole;
                }
            }
        }
    }
}
```

As shown in the example YANG data model above, the resources include a site, and within the site, a branch and a device. In particular, the site has one or more branches, the site as a few core devices, and the branch has one or more edge devices. The device role data indicates that there is a core device and an edge device. Accordingly, management device 10 constructs graph 150 to have site vertex 152, branch vertex 154, and device vertex 156. Management device 10 also constructs graph 150 to include has-edge 158 from site vertex 152 to branch vertex 154, and ref-edges from site vertex 152 and branch vertex 154 to device vertex 156. Further, management device 10 creates properties information 164 for device vertex 156, because device vertex 156 is a leaf vertex.

Filters should be able to determine the core and edge device for the given site using graph 150. An example query to get the core and edge device of site "Bangalore" is shown below:

```
site(name:"Bangalore") {
    device(role:core) {
        id
    }
    branch( ) {
        device(role:edge) {
            id
        }
    }
}
```

An example filter DSL query is shown below:

```
site(name:"Bangalore") {
    device(role:"PE") {
        id,
        interface {
            name
        }
    }
}
```

Figure 9:
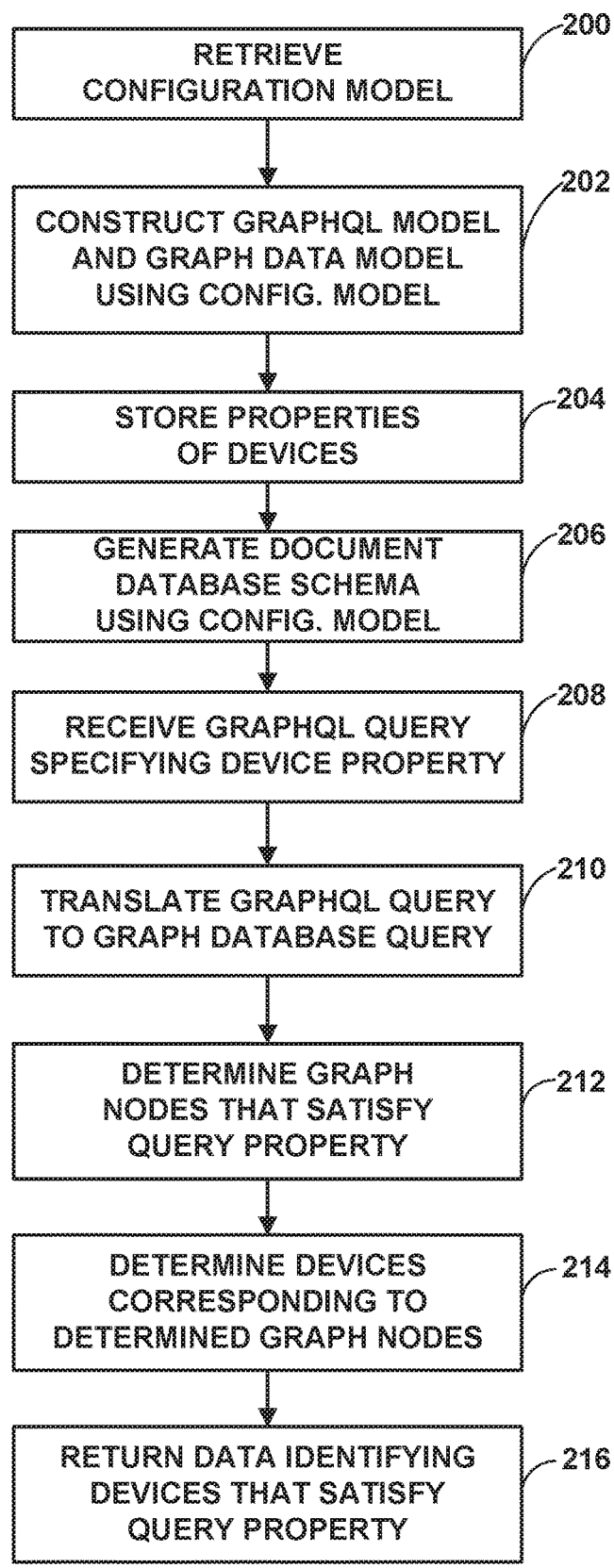
FIG. 9 is a flowchart illustrating an example method of generating and using a GraphQL model in accordance with the techniques of this disclosure.

FIG. 9 is a flowchart illustrating an example method of generating and using a graph data model in accordance with the techniques of this disclosure. The method of FIG. 9 is described as being performed by management device 10 of FIGS. 1 and 2 for purposes of example and explanation. However, it should be understood that other devices may be configured to perform this or a similar method.

Initially, management device 10 retrieves a data model (200) for a plurality of network devices being managed in a network management system. For example, management module 24 may retrieve the data model from configuration database 40. The configuration model may be any model that can be expressed in YANG, such as a low-level (e.g., device-level) configuration data model, a service model, an inventory model, or the like. Management module 24 then generates a GraphQL model and a graph data model using the data model (202). For example, management module 24 may construct the graph data model to have a plurality of nodes (also referred to as vertices) each corresponding to one of the network devices being managed, as indicated by the data model. As discussed above with respect to FIG. 8, management device 10 may generate graph 150 to include device vertex 156, representing one or more managed network devices.

Management device 10 then stores properties of each of the network devices (204). In particular, management device 10 may store the properties in associated with corresponding nodes of the graph data model, according to the data model. For example, as shown in FIG. 8 and discussed above, management device 10 may determine properties of various devices, and store properties 164 associated with device vertex 156.

Management device 10 may further generate a document database schema using the data model (206) in accordance with the techniques of this disclosure as discussed above. For example, assuming the data model is expressed in YANG, management device 10 may model a YANG list as a document of the document database schema and set properties of the document according to corresponding properties from the data model. If two devices are modeled as having a parent-child relationship in the graph data model, management device 10 may generate a parent vertex document corresponding to a parent vertex of the graph data model and a child vertex document corresponding to a child vertex of the graph data model. Management device 10 may further set a child property of the parent vertex document to identify the child vertex document, and a parent property of the child vertex document to identify the parent vertex document.

Management device 10 may then receive a GraphQL query specifying a device property (208). In accordance with the techniques of this disclosure, management device 10 may translate the GraphQL query into a graph database query (210). Management device 10 may then search the properties associated with vertices/nodes of the graph data model to determine which of the vertices/nodes has the property specified in the graph database query, and likewise, which devices correspond to the determined vertices/nodes. In particular, management device 10 may determine graph nodes that satisfy the query property (212) and/or using the document database schema, then determine which devices correspond to the determined graph nodes (214). Management device 10 may further support one or more of sorting, searching, or filtering the graph data model using the document database schema. Finally, management device 10 returns data identifying the devices that satisfy the query property (216). For example, management device 10 may generate a report identifying one or more network devices having the specified query property, and send the report back to a device from which the query was received. Although FIG. 9 shows receipt of the query after having constructed the graph data model, it should be understood that in some examples, management device 10 may initially generate the graph data model and GraphQL model in response to receipt of such a query.

Again with respect to the example of FIG. 8, the received query may specify a property of either a device that is a core device or an edge device. Assuming that the query specifies a device that is an edge device, management device 10 may determine network devices associated with device vertex 156 that are also edge devices, then generate a report indicating which of the network devices that were determined to be associated with device vertex 156 that are also edge devices as indicated by, e.g., properties 164. Management device 10 may then return (e.g., output) the report to a device or entity from which the query was originally received.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
retrieving data representing a configuration data model for a plurality of network devices managed by a network management system, wherein the configuration data model includes one or more data structures including list data structures, leaf list data structures, container data structures, and container with presence data structures;
constructing a GraphQL model, comprising:
constructing a plurality of nodes of the GraphQL model, the nodes including a first set of nodes each corresponding to one of the network devices according to the configuration data model, the nodes further including a second set of nodes including list nodes, container nodes, and container with presence nodes corresponding to the respective list data structures, container data structures, and container with presence data structures of the configuration data model, wherein constructing the nodes comprises constructing one or more of the second set of nodes corresponding to the list data structures to include properties representing the leaf list data structures; and
constructing a plurality of edges between the nodes in the GraphQL model, the edges including containment edges and reference edges;
storing data representing properties of the network devices associated with corresponding nodes of the first set of nodes of the GraphQL model according to the configuration data model;
receiving a GraphQL query including data representing at least one query property;
determining which of the nodes has a property matching the at least one query property; and
returning data identifying which of the network devices corresponds to the nodes having the property matching the at least one query property.

2. The method of claim 1, wherein the configuration data model is expressed in Yet Another Next Generation (YANG) data modeling language, and wherein the configuration data model comprises one of a low-level device configuration model, a service model, or an inventory model.

3. The method of claim 1, further comprising generating a GraphQL schema from the configuration data model.

4. The method of claim 1, wherein the GraphQL query comprises data representing data model paths and at least one condition corresponding to the at least one query property.

5. The method of claim 1, further comprising generating a document database schema from the configuration data model.

6. The method of claim 5, wherein generating the document database schema comprises:
modeling a list with an entity extension of the configuration data model as a document of the document database schema; and
setting properties of the document according to corresponding properties from the configuration data model.

7. The method of claim 5, wherein generating the document database schema comprises:
generating a parent vertex document corresponding to a parent vertex of the GraphQL model having a child vertex of the GraphQL model, wherein generating the parent vertex document comprises generating the parent vertex document to have a child property including an identifier for a child vertex document corresponding to the child vertex; and
generating the child vertex document corresponding to the child vertex, wherein generating the child vertex document comprises generating the child vertex document to have a parent property including an identifier for the parent vertex document.

8. The method of claim 5, wherein determining which of the nodes has the property matching the at least one query property comprises using the document database schema to support one or more of sorting, searching, or filtering the GraphQL model to determine which of the nodes has the property matching the at least one query property.

9. A device of a network management system, the device comprising:
a memory configured to store data representing a configuration data model for a plurality of network devices managed by the network management system, wherein the configuration data model includes one or more data structures including list data structures, leaf list data structures, container data structures, and container with presence data structures; and
one or more processors implemented in circuitry and configured to:
retrieve the data representing the configuration data model;
construct a GraphQL model, wherein to construct the GraphQL model, the one or more processors are configured to:
construct a plurality of nodes of the GraphQL model, the nodes including a first set of nodes each corresponding to one of the network devices according to the configuration data model, the nodes further including a second set of nodes including list nodes, container nodes, and container with presence nodes corresponding to the respective list data structures, container data structures, and container with presence data structures of the configuration data model, wherein the one or more processors are configured to construct one or more of the second set of nodes corresponding to the list data structures to include properties representing the leaf list data structures; and
construct a plurality of edges between the nodes in the GraphQL model, the edges including containment edges and reference edges;
store data representing properties of the network devices associated with corresponding nodes of the GraphQL model according to the configuration data model;
receive a GraphQL query including data representing at least one query property;
determine which of the nodes has a property matching the at least one query property; and
return data identifying which of the network devices corresponds to the nodes having the property matching the at least one query property.

10. The device of claim 9, wherein the configuration data model is expressed in Yet Another Next Generation (YANG) data modeling language, and wherein the configuration model comprises one of a low-level device configuration model, a service model, or an inventory model.

11. The device of claim 9, wherein the one or more processors are configured to generate a GraphQL schema from the configuration data model.

12. The device of claim 9, wherein the GraphQL query comprises data representing data model paths and at least one condition corresponding to the at least one query property.

13. The device of claim 9, wherein the one or more processors are further configured to generate a document database schema from the configuration data model.

14. The device of claim 13, wherein to generate the document database schema, the one or more processors are configured to:
model a list with an entity extension of the configuration data model as a document of the document database schema; and
set properties of the document according to corresponding properties from the configuration data model.

15. The device of claim 13, wherein to generate the document database schema, the one or more processors are configured to:
generate a parent vertex document corresponding to a parent vertex of the GraphQL model having a child vertex of the GraphQL model, wherein the one or more processors are configured to generate the parent vertex document to have a child property including an identifier for a child vertex document corresponding to the child vertex; and
generate the child vertex document corresponding to the child vertex, wherein the one or more processors are configured to generate the child vertex document to have a parent property including an identifier for the parent vertex document.

16. The device of claim 13, wherein to determine which of the nodes has the property matching the at least one query property, the one or more processors are configured to use the document database schema to support one or more of sorting, searching, or filtering the GraphQL model to determine which of the nodes has the property matching the at least one query property.

17. A computer-readable storage medium having stored thereon instructions that, when executed, cause a processor of a management device configured to manage a plurality of network devices of a network management system to:
retrieve data representing a configuration data model for the plurality of network devices, wherein the configuration data model includes one or more data structures including list data structures, leaf list data structures, container data structures, and container with presence data structures;
construct a GraphQL model, comprising instructions that cause the processor to:
construct a plurality of nodes, the nodes including a first set of nodes each corresponding to one of the network devices according to the configuration data model, the nodes further including a second set of nodes including list nodes, container nodes, and container with presence nodes corresponding to the respective list data structures, container data structures, and container with presence data structures of the configuration data model, wherein the instructions that cause the processor to construct the nodes comprise instructions that cause the processor to construct one or more of the second set of nodes corresponding to the list data structures to include properties representing the leaf list data structures; and
construct a plurality of edges between the nodes in the GraphQL model, the edges including containment edges and reference edges;
store data representing properties of the network devices associated with corresponding nodes of the GraphQL model according to the configuration data model;
receive a GraphQL query including data representing at least one query property;
determine which of the nodes has a property matching the at least one query property; and return data identifying which of the network devices corresponds to the nodes having the property matching the at least one query property.

18. The computer-readable storage medium of claim 17, further comprising instructions that cause the processor to generate a GraphQL schema from the configuration data model.

19. The computer-readable storage medium of claim 17, wherein the one or more processors are further configured to generate a document database schema from the configuration data model.

20. The method of claim 1, wherein the configuration data model further includes one or more features data structures, and wherein constructing the plurality of nodes comprises constructing the second set of nodes to include a single features node including a plurality of properties, the properties of the features node corresponding to the features data structures of the configuration data model and having values representing whether the features are supported.

* * * * *